Patented Feb. 23, 1937

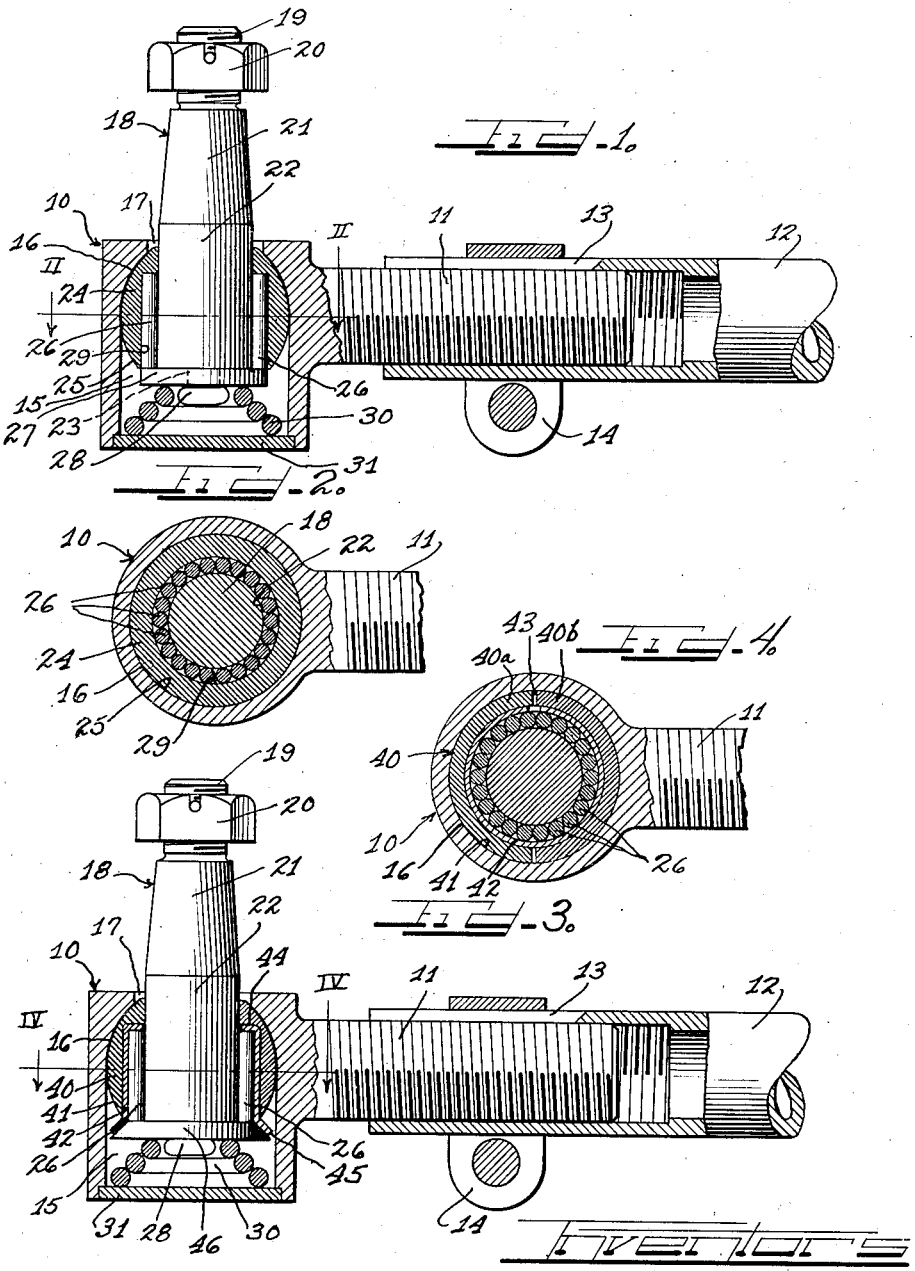

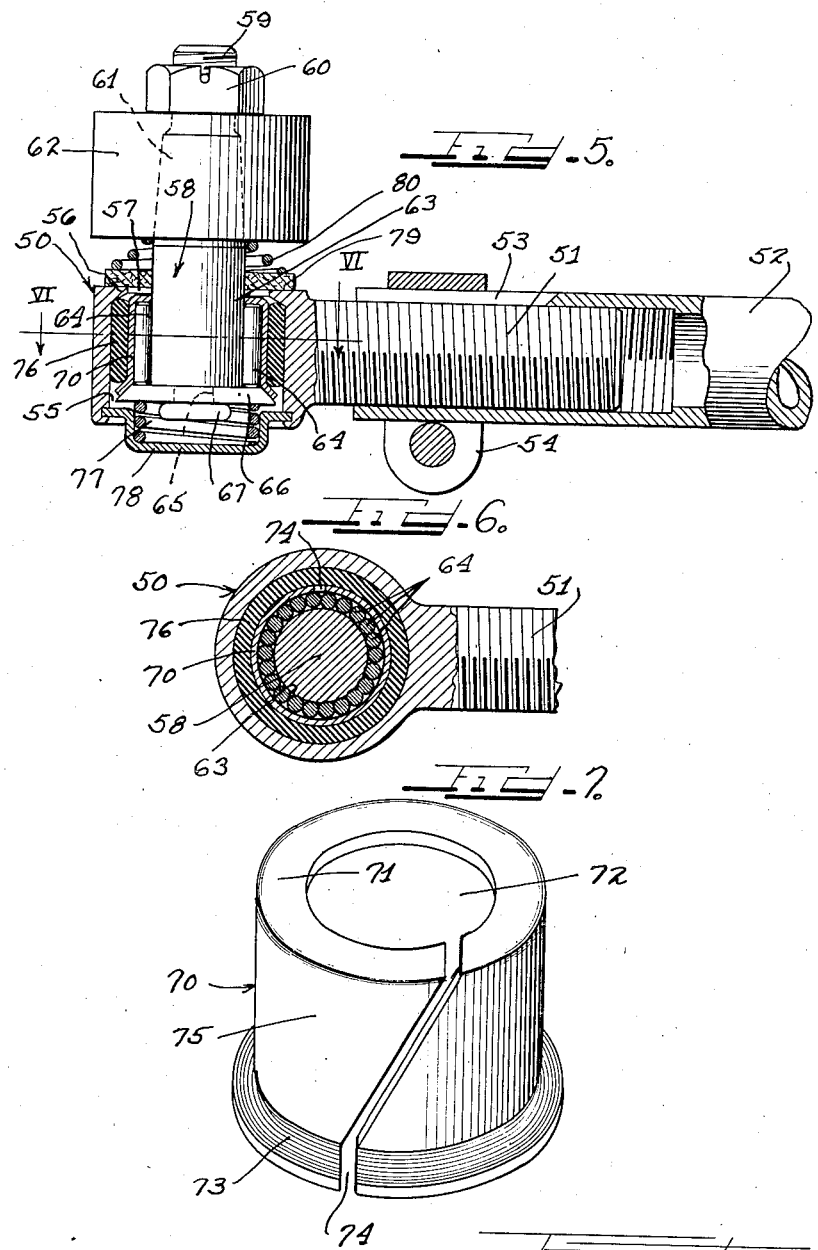

2,071,341

UNITED STATES PATENT OFFICE 2,071,341

NEEDLE BEARING JOINT

George H. Hufferd and Matthew P. Graham, Detroit, Mich., assignors to Thompson Products, Incorporated, Cleveland, Ohio, a corporation of Ohio Application February 26, 1934, Serial No. 712,901

8 Claims. (Cl. 287—90)

This invention relates to improvements in joints such as are used in drag links, tie rods and the like connections in automotive vehicles.

More specifically, this invention relates to joints having studs freely rotatable on needle bearing surfaces provided in the joint socket.

It is an object of this invention to provide a joint having a stud freely rotatable about its own axis on a bearing surface which acts as a sliding bearing under normal conditions and as a roller bearing under abnormal conditions.

Another object of this invention is to provide a joint having a connecting member tiltable relative to the other part of the structure and freely rotatable about its own axis on a needle bearing surface.

Another object of this invention is to provide a joint having a stud freely rotatable about its own axis on needle bearings and readily tiltable with respect to the joint housing.

A further object of this invention is to provide a rubber tie rod joint having a stud element freely rotatable about its own axis on a needle bearing surface.

A further object of this invention is to provide a ball joint having a stud rotatable in the ball on needle bearing surfaces.

Other and further objects of this invention will be apparent to those skilled in the art from the accompanying detailed description of the accompanying sheets of drawings, which form a part of this specification.

On the drawings:

Figure 1 is a cross-sectional view, with parts in elevation, of a tie rod end embodying a form of the joint of this invention.

Figure 2 is a fragmentary cross-sectional view taken substantially along the line II—II of Figure 1.

Figure 3 is a cross-sectional view, with parts in elevation, of a tie rod end embodying another form of tie rod joint according to this invention.

Figure 4 is a fragmentary cross-sectional view taken substantially along the line IV—IV of Figure 3.

Figure 5 is a cross-sectional view, with parts in elevation, of a tie rod end embodying a rubber tie rod joint according to this invention.

Figure 6 is a fragmentary cross-sectional view taken substantially along the line VI—VI of Figure 5.

Figure 7 is an enlarged isometric view of a split needle bearing race used in some modifications of the joint of this invention.

As shown on the drawings:

In Figures 1 and 2, the reference numeral 10 indicates generally a joint housing or socket having a laterally extended threaded shank portion 11. The shank 11 is threaded into a tie rod 12 which is split at its end, as shown at 13, for permitting a clamp 14 to tighten the rod in adjusted threaded relation around the shank 11.

The housing 10 has an opening 15 extending therethrough. The axis of the opening 15 is perpendicular to the axis of the shank portion 11.

The inner surface of the housing 10 is curved inwardly near the top thereof to form a segmental spherical bearing surface 16 and to define at the top of the housing 10 an annular opening 17. A stud 18 extends freely through the opening 17 in spaced relation therefrom to permit angular or tilting movement of the stud relative to the housing 10.

The stud 18 is composed of a threaded portion 19 for receiving a locking nut 20; a tapered portion 21 for receiving a link connection (not shown); a cylindrical bearing portion 22 extending into the housing 10, and a peg end 23 extending from the bottom of the cylindrical portion 22.

A ball element 24 is disposed around the cylindrical bearing portion 22 of the stud 18. The ball element 24 has a spherical outside bearing surface 25 cooperating with the segmental spherical bearing surface 16 of the housing 10 to permit angular or tilting movement of the stud in the housing.

A plurality of needle bearings 26 are inserted between the ball 24 and the bearing portion 22 of the stud, as shown. The needle bearings 26 are held in position by a washer or disc 27 fitted around the peg 23. The peg 23 is peened, as shown at 28, to tightly engage the washer 27 against the bottom of the stud 18.

The needle bearings 26 are small diameter rods contacting with one another so as to form, during normal operation, a sliding bearing surface or a bushing. In the event of failure of lubrication or during times of overload, the needle bearings 26 are adapted to roll about their own axes. The needle bearings therefore act both as a bushing or sliding bearing and as a plurality of roller bearings, thereby insuring free rotation of the stud 18 about its own axis both during normal and abnormal operating conditions.

The inside surface 29 of the ball seat element 24 acts as an outer race for the needle bearings while the cylindrical bearing surface 22 of the stud 18 acts as an inside race for the bearings.

During normal operating conditions, however, the needle bearings act as a bushing and form their own bearing surface for the portion 22 of the stud 18.

The stud and ball seat element are held in operative position in the opening 15 by means of a tapered coil spring compressed between the washer 27 and a cover plate 31 which is pressed into the housing at the bottom thereof. It is obvious that the cover plate 31 may be in screw-thread relation with the housing 10, if desired, to permit removal of the stud and ball element therefrom.

In Figures 3 and 4, there is shown a modified joint structure according to this invention in which a split ball seat element is used in place of the seat element 24 shown in Figures 1 and 2. Similar parts in Figures 3 and 4 have been marked with identical reference numerals used in Figures 1 and 2.

As best shown in Figure 4, the ball seat element 40 is composed of two half sections, 40a and 40b respectively. The outside spherical bearing surfaces 41 of the ball seat element 40 cooperate with the segmental spherical bearing surface 16 in the housing 10 to permit tilting or angular movements of the stud 18 relative to the housing. As shown in Figure 3, the stud 18 extends through the ball seat member 40 in the same manner as the stud shown in Figure 1 extends through the ball seat member 24.

A split bushing cap 42, being similar to the cap shown in Figure 7, is provided for forming an outer raceway for the needle bearings 26. The bushing cap 42 is preferably slotted as at 43 (Figure 4) to insure a tight engagement of the needle bearings 26 with the bearing portion 22 and the stud 18. As shown in Figure 7, the slot may be cut diagonally to prevent a binding of any of the needle bearings in the cap.

The top of the bushing cap 42 is provided with an inturned flange 44 defining an opening through which the stud 18 may extend and providing a support for the upper ends of the needle bearings 26.

The bottom end of the bushing cap 42 is formed with a sloping flange 45 extending outwardly for receiving a tapered washer 46, which is held on the end of the stud by the peened portion 28. A coil spring 30, similar to that shown in Figure 1, is held under compression between the washer 46 and a cover plate 31 secured in the housing 10.

In the construction shown in Figures 3 and 4, the stud 18 with ball seat elements 40a and 40b disposed therearound, is held in operative position against the inside segmental spherical bearing surfaces 16 of the housing 10 by the spring 30. The spring 30 also holds the stud 18 in the proper bearing relationship within the ball seat element.

The split bushing cap 42 is normally held in the ball seat under a slight compression thereby tending to urge the ball seat elements 40a and 40b into proper bearing relation with the housing bearing surface 16. This, of course, automatically compensates for wear of the bearing surfaces and maintains the joint in proper adjustment. The slot 43 in the cap 42 also permits expansion and contraction of the needle bearings during use. The needle bearings 26 are thus held in close contact with each other to form a sliding bearing surface for the stud during normal operation. However, each needle bearing 26 is adapted to turn on its own axis to provide a roller bearing surface for the stud under abnormal conditions, since the cap 42 forming the outer race for the needle bearings can expand to prevent a binding of the bearings.

In Figures 5 and 6, there is illustrated a modified form of needle bearing joint in which angular or tilting movement of the stud element relative to the housing is permitted by a rubber bushing.

As shown in Figures 5 and 6, the reference numeral 50 indicates a casing or socket having a laterally extended threaded shank portion 51 in screw-thread relation with a tie rod 52. The end of the tie rod 52 is slotted, as shown at 53, to permit the shank 51 to be clamped in proper threaded relation into the tie rod by means of a clamp 54.

The socket or housing 50 is provided with an opening 55 extending therethrough, having an axis perpendicular to the axis of the shank portion 51.

An inturned flange 56 is provided at the top of the housing 50 for defining an annular opening 57 through which the stud element 58 may freely extend from the housing in spaced relation from the flange.

The stud element 58 is composed of a threaded portion 59 for receiving a locking nut 60 thereon; a tapered portion 61 for receiving the end 62 of a link connection; a cylindrical bearing portion 63 extended into the housing for receiving therearound a plurality of needle bearings 64; and a peg 65 extending from the bottom thereof for receiving therearound a tapered washer 66. The tapered washer is held in position on the bottom of the stud 58 by peening over the end of the peg 65 as shown at 67.

The needle bearings 64 are mounted between the bearing portion 63 of the stud 58 and a split bushing cap 70. As shown in Figure 7, the bushing cap 70 is provided with an inturned top flange 71 defining an opening 72 through which the stud 58 extends in close proximity thereto. The flange 71 abuts the top ends of the needle bearings 64 to hold these needle bearings in proper alignment.

The bottom portion of the bushing cap 70 is provided with an out-turned sloping flange 73 for receiving a tapered washer 66 which is held on the bottom of the stud member 58. The bushing cap 70 is slotted diagonally, as shown at 74. The inside surface of the vertical wall 75 of the bushing cap 70 acts as an outer raceway for the needle bearings 64. Since the bushing cap is split, the outer raceway can be contracted and expanded to meet operating requirements during usage. For example, if the bearing surfaces become worn, the bushing cap 70 may be contracted to take up the wear. Also, the cap is always held in the housing 50 under compression, and this prevents a rattling of the joint elements.

A rubber bushing 76 is placed around the bushing cap 70 in the opening 55 of the housing 50. This rubber bushing permits angular or tilting movement of the stud 58 relative to the housing 50. A tight fit between the housing and the stud element is effected by compressing the split bushing cap 75 into the rubber bushing 76.

The stud element and needle bearings are held in operative position in the bushing cap 70 by a coil spring 77 which is compressed between the tapered washer 66 and a cover plate 78 secured in the bottom of the housing.

Loss of lubricant or ingress of dirt through the opening 57 in the top of the housing 50 is prevented by a leather washer 79 which is placed around the stud and rests on top of the housing.

The washer 79 is held against the housing without interfering with angular movement of the stud by means of a tapered coil spring 80.

The rubber tie rod joint illustrated in Figures 5 and 6 shows that the needle bearing mounting for the stud element may be used in rubber tie rod joints as well as in the metal ball joints illustrated in Figures 1 to 4, inclusive.

While this invention has been illustrated as being embodied in three specific forms of tie rod joints, it should be understood that the underlying features of this invention are of a broad nature and capable of being embodied in many specific forms of joints. The needle bearing construction of this invention permits a free rotation of the stud element under all operating conditions.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. In a joint, a socket having inside segmental spherical bearing surfaces, a ball seat element slidable on said bearing surfaces, a stud extending freely from said socket having a cylindrical bearing portion rotatable in said ball seat element, a plurality of needle bearings disposed longitudinally between the cylindrical bearing portion of said stud and said ball seat element in full bearing contact therewith and with each other, means for holding said needle bearings in said ball seat element and spring urged means for holding said ball element in operative position against the said segmental spherical bearing surfaces of the socket.

2. A joint comprising a housing, a stud extending therefrom having a cylindrical bearing portion therein, a plurality of needle bearings disposed circumferentially around said bearing portion in full bearing contact therewith and with each other, a cylindrical metallic sleeve around said bearing surface forming an outer raceway for the needle bearings, said sleeve having a diagonal slot cut thereacross and an inturned end flange terminating in close proximity to the stud bearing surface to form a retainer for the needle bearings, a resilient bushing compressed between said housing and said sleeve to close said sleeve and maintain the needle bearings against the bearing surface of the stud and also to permit tilting action of the stud and spring urged means for holding the stud in operative position in the housing.

3. A joint comprising a housing, a stud in said housing having a cylindrical bearing surface and a peg end, a circular disc secured around said peg end having an outside circumference extending beyond the cylindrical bearing surface, a plurality of needle bearings disposed circumferentially around said bearing surface each having an end thereof supported on said disc, a split sleeve forming an outer raceway for said needle bearings having an inturned flange for engaging the other end of said bearings, and resilient means for compressing said sleeve against said bearings, said resilient means also providing tilting movement of the stud relative to the housing.

4. A joint comprising a socket having an inside segmental spherical bearing surface, a ball element having a segmental spherical bearing surface slidable on said socket bearing surface and an inside cylindrical bearing surface, a stud having a cylindrical bearing surface extending through said ball element and a plurality of small diameter rods longitudinally disposed between said cylindrical bearing surface of the stud and the cylindrical bearing surface of the ball element, said rods being in contact with each other to form, in normal operation, a sliding bearing surface and, in abnormal operation, a roller bearing surface.

5. A joint comprising a housing, a stud extending freely from said housing and having a cylindrical bearing surface and a peg end therein, a circular disc extending around said peg end having an outside circumference extending beyond the cylindrical bearing surface, a plurality of needle bearings disposed circumferentially around said bearing surface, each having an end thereof supported on said disc, said needle bearings being in full bearing contact with the cylindrical bearing surface of the stud and with each other, a stud mounting means tiltably supporting the stud in the housing disposed around said needle bearings providing an outer raceway therefor and spring means urged against said disc for maintaining said elements of the joint in operative relation.

6. A joint comprising a housing, a stud extending therefrom and having a cylindrical bearing portion and an enlarged end portion therein, seating means in the housing disposed around the cylindrical portion of the stud for tiltably supporting the stud relative to the housing, said means contacting the stud at one end thereof and being spaced from the stud below said end, a plurality of elongated needles disposed circumferentially around the cylindrical portion of the stud above the enlarged end thereof and abutting the stud contacting portion of the seating means at one end thereof, said needles being in full bearing contact with the cylindrical portion of the stud and with each other for providing free rotation of the stud about its own axis, said needles normally having a sliding bearing contact around the cylindrical stud portion but being capable of rotating about their own axes under abnormal conditions and means cooperating with the enlarged end of the stud to hold the joint elements in operative relation within the housing.

7. A joint comprising a housing, a stud extending therefrom and having a cylindrical bearing portion and an outturned collar portion therein, seating means in the housing disposed around the cylindrical portion of the stud for tiltably supporting the stud relative to the housing, said means being disposed near the stud at one end thereof and being spaced from the stud below said end to provide a flange for defining with the stud an annular chamber, a plurality of elongated needles mounted within said chamber circumferentially around the cylindrical portion of the stud and abutting the stud collar and the flange of the seating means at the end thereof, said needles being in full bearing contact with the cylindrical portion of the stud and with each other for providing free rotation of the stud about its own axis, said needles normally having a sliding bearing contact around the cylindrical stud portion but being capable of rotating about their own axes under abnormal conditions, and resilient means cooperating with the collar portion of the stud for urging the joint elements into operative relation within the housing.

8. In a joint, a housing, a stud extending therefrom having a cylindrical bearing portion therein, a plurality of needle bearings disposed circumferentially around said bearing portion in full bearing contact therewith and with each other, a cylindrical metallic sleeve around said bearing portion of the stud forming an outer raceway for the needle bearings, said sleeve having a diagonal slot cut thereacross and an inturned end flange terminating in close proximity to the stud bearing surface to form a retainer for the ends of the needle bearings, and resilient means in said housing for producing a radial compression of said sleeve to take up wear of the bearing surfaces.

GEORGE H. HUFFERD.
MATTHEW P. GRAHAM.